G. H. JONES.
BEAM OF BALSA AND LIKE WOODS AND FASTENING DEVICE THEREFOR.
APPLICATION FILED DEC. 24, 1918.
1,358,080.
Patented Nov. 9, 1920.
2 SHEETS—SHEET 1.
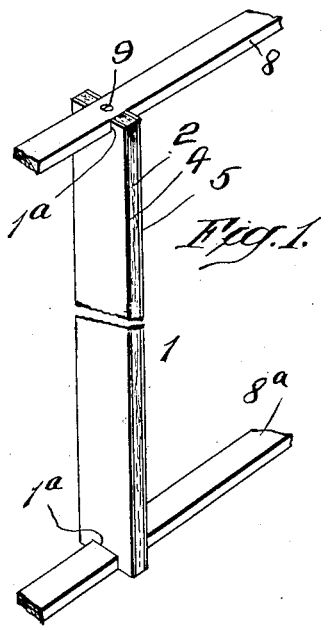
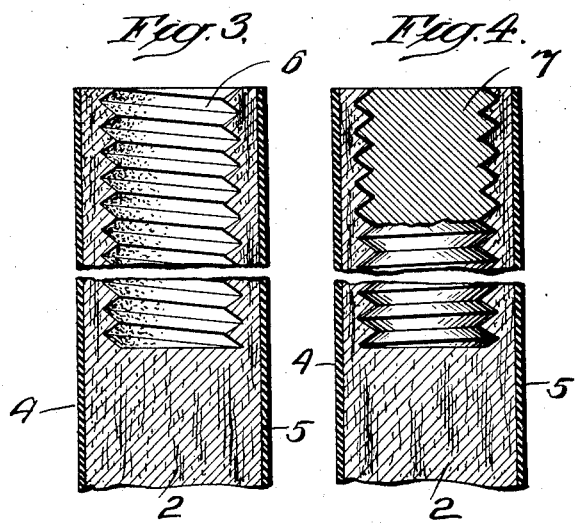
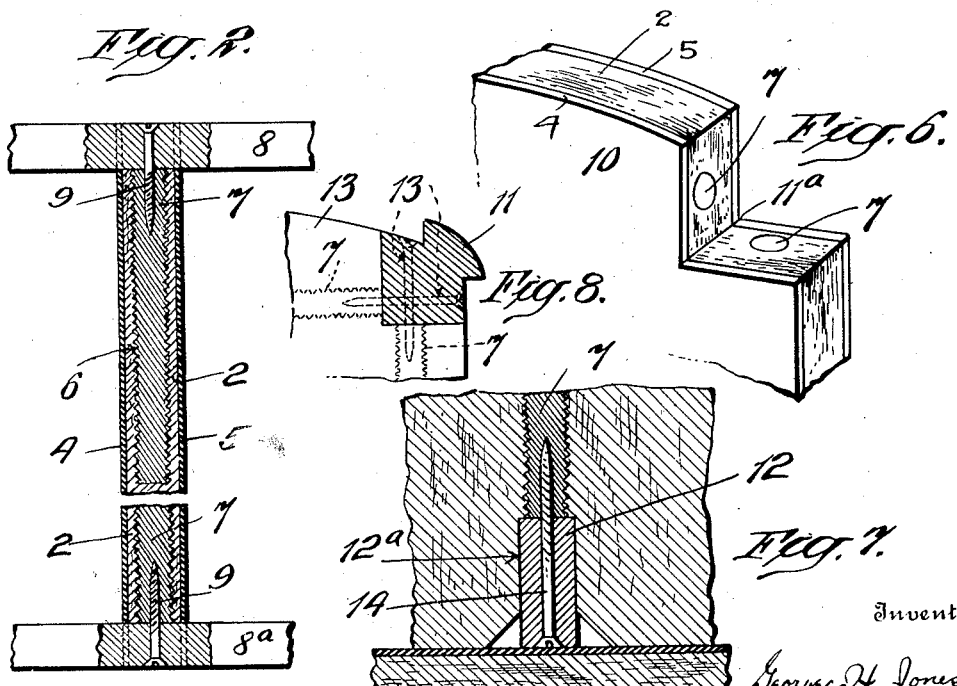
Inventor
George H. Jones
By Joseph F. O'Brien
His Attorney

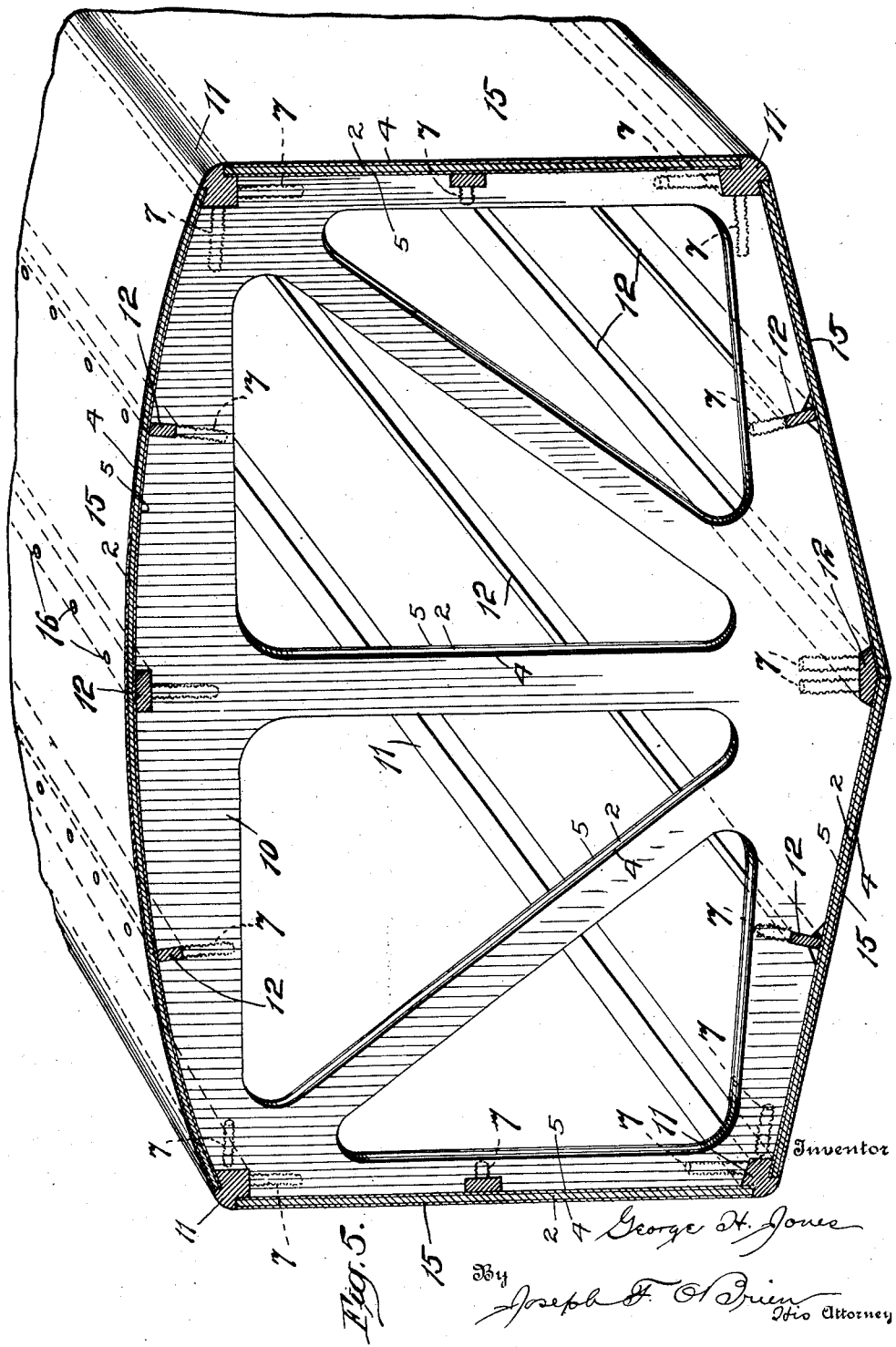

UNITED STATES PATENT OFFICE.

GEORGE H. JONES, OF NEW YORK, N. Y.

BEAM OF BALSA AND LIKE WOODS AND FASTENING DEVICE THEREFOR.

1,358,080.   Specification of Letters Patent.   Patented Nov. 9, 1920.

Application filed December 24, 1918. Serial No. 268,206.

*To all whom it may concern:*

Be it known that I, GEORGE H. JONES, a citizen of the United States, and a resident of the borough of Manhattan, city, county, and State of New York, have invented certain new and useful Improvements in Beams of Balsa and like Woods and Fastening Devices Therefor, of which the following is a specification.

This invention relates to improvements in beams of balsa and like woods and fastening devices therefor.

It is known that beams and other structural elements composed wholly or in part of balsa and like light woods have considerable structural strength and it is therefore desirable to utilize this structural strength in various structures. It has furthermore been found that a composite beam, principally composed of balsa or like wood and preferably formed of a relatively thick core or body of balsa wood with relatively thin layers or skins of a hard and tough material, such as tough fiber, securely fastened on opposite sides thereof so as to form a substantially integral unit, has greatly enhanced structural strength and other qualities that make the use of such a beam very desirable in many structures. It has heretofore been impossible, however, to secure rigid connections by screws and nails between such beams and other structural elements because of the fact that the pithy cellular structures of balsa and similar soft woods are not sufficiently dense and tough to provide sufficient local strength, tenacity or friction surface to retain metallic screws or nails; in fact a metallic screw or nail driven into balsa or like wood simply displaces, crushes and ruptures the cellular structure and may be readily removed.

By the use of my invention, I obviate these difficulties, and permit a rigid connection to be secured between two or more such beams, or between a beam principally composed of balsa wood and other structural elements. In the preferred embodiment of my invention, such a beam is provided, at a suitable point or points contiguous to the place where it is desired to form a joint, with one or more screw-threaded bores, each preferably of coarse thread and large pitch, and in each bore a dowel provided with a screw-thread of similar pitch to that of the bore and composed of a harder and tougher wood, having a denser cellular structure capable of retaining the desired metallic fastening device, such as a screw, is inserted. In a dowel of the character described, the screw-thread will provide a series of lateral projections which will serve to key it in place and furthermore a relatively large contacting surface between said dowel and the soft cellular structure of the balsa wood is procured. Said dowel is preferably securely fixed against rotation after insertion and for this purpose, I preferably use a suitable glue which when dry fixes such screw-threaded dowel against rotation and prevents it from rotating with the metallic screw when the same is inserted in said dowel and from rupturing the cellular structure of the wood below the bore. A balsa wood beam so equipped with a fixed screw-threaded dowel of a relatively tougher wood may be thereupon utilized as a structural element in many structures including airplanes, boats, pontoons, floats and the like.

Other objects of my invention will be in part obvious from the annexed drawings and in part indicated in connection therewith by the following analysis of this invention.

This invention accordingly also consists in the features of construction, combinations of parts, and in the unique relationship of the members and in the relative proportioning and disposition thereof, all as more completely outlined in the following specification and in said drawings.

To enable others skilled in the art so fully to comprehend the underlying features of my invention that they may embody the same by numerous modifications in structure and relationship of parts contemplated by this invention, drawings depicting a preferred form have been annexed as a part of this disclosure, and in such drawings like characters of reference denote corresponding parts throughout all the views, of which:—

Figure 1 illustrates in perspective an upright beam of balsa or like wood joined to horizontal beams of relatively harder or tougher wood;

Fig. 2 is an enlarged sectional view of the said upright beam and parts of said horizontal beams;

Fig. 3 is a section, further enlarged, illustrating one end of the balsa wood upright and particularly showing the screw-threaded bore therein before insertion of a dowel of harder wood;

Fig. 4 is a view similar to Fig. 3 with the hardwood dowel inserted in the bore;

Fig. 5 is a perspective view of a structure in which partitions and sheathing both formed of composite balsa wood and fiber beams are securely connected to other structural members of harder wood;

Fig. 6 is a detail perspective view of the corner of a composite-beam partition before the corner beam of harder wood is secured thereto;

Fig. 7 is another detail section through the balsa wood core of a partition showing its connection to an intermediate beam of harder wood and the sheathing on the outside thereof; and Fig. 8 illustrates the method of securing the corner beam of hard wood to the corner of the partition illustrated in Fig. 6.

Referring now to these drawings, 1 indicates an upright beam which, in the preferred embodiment of my invention shown, is a composite beam formed of a relatively thick body or core of balsa or like light, soft and pithy wood 2 and relatively thin layers or skins, 4 and 5 respectively, of a hard and tough material, such as tough fiber on opposite sides thereof. Such a beam has greatly enhanced structural strength and other qualities which make it desirable for use in a great variety of structures, including airplanes, pontoons, boats, floats, etc. It has been impossible, however, to utilize the ordinary metallic screw or nail for securing such beams to each other or to other structural members because the soft, pithy cellular structure of the balsa wood is not dense or tough enough to provide sufficient local strength, tenacity, or friction surface to retain such metallic screws or nails. Such a fastening device when driven into balsa or like wood, therefore simply crushes or ruptures the cellular tissue and displaces or moves aside the particles thereof, so that the said device may be readily removed with practically no frictional resistance. To obviate this difficulty and to enable screws and nails to be employed in fastening such beams together, or to other structural elements, I provide such beams, at a suitable point or points contiguous to the place where it is desired to form a joint therewith, as for example at opposite ends of the beam, with one or more screw-threaded bores 6, preferably of coarse thread and large pitch, and into each of such bores I insert a screw-threaded dowel 7, of similar pitch and thread and composed of a wood or other material having a cellular structure capable of retaining a metallic screw or nail. These dowels are suitably fixed against rotation after insertion in place in the bore, preferably by securely gluing the same in the bores 6. A beam is thus produced which may be securely fastened by screws or like metallic devices to other beams of harder and tougher wood or to like balsa wood beams or composite beams of balsa wood and fiber; and may therefore be utilized in a great many structures where the characteristics of balsa wood make same desirable.

In Figs. 1 and 2 I have shown the upright 1 provided with cut-out seats $1^a$ $1^a$ into which seats horizontal connecting members 8, $8^a$ composed of a suitable hard or tough wood are fitted and then connected to the upright 1 by metallic screws 9 which are driven transversely through said beam members 8, $8^a$ and into the dowels 7 longitudinally thereof, thus procuring a rigid and secure connection or joint between such members.

In Figs. 5 to 8 inclusive I have illustrated a section of a tubular structure or construction suitable for use in a pontoon, in which partitions 10 formed of composite beams or boards of balsa wood and fiber are securely fastened to corner connecting members 11 and to intermediate connecting members 12 composed of a hard or tough wood. This connection is made in a manner similar to that hereinabove described. Thus corner seats $11^a$ are formed in the partitions, bores are made in the balsa wood core, screw-threaded dowels are inserted in these bores, the corner connecting beams are seated in the corner seats and are securely fastened by metallic screws 14 driven transversely through the said connecting corner beam members and longitudinally into the dowel 7 of hard wood. The intermediate connecting members 12 of this structure are likewise preferably fitted in seats $12^a$ and securely fastened to the partitions by screws 14 in a manner similar to that just described.

The sheathing 15 which in the structure illustrated is also formed of composite balsa wood and fiber, as hereinabove described, is fastened to the framework or skeleton formed by the upright partitions and connecting beams by rivets 16, the flat heads of which abut against the top fiber layer of the sheathing and have a suitable connection to the hard wood corner and intermediate beams at suitable points. This sheathing may also be glued to the partitions and hardwood beams at the intersections thereof. A complete structure is thus formed almost completely made up of composite balsa and fiber beams which will be extremely light and will have great structural strength.

Many modifications of my invention hereinabove described will suggest themselves to those skilled in the art and I therefore do not desire to limit the scope of this invention to the details of construction hereinabove set forth. Furthermore wherever I have used the term "beam" I desire to include boards, timbers or other structural elements of any kind.

Having described my invention, I claim:

1. As an article of manufacture, a structural beam composed of a light, soft, pithy wood having, in a suitable position to permit the securing of said beam to other structural members, a screw-threaded bore, a screw-threaded dowel of a tougher wood screwed in said bore, and suitable means for fixing said dowel against rotation after insertion.

2. As an article of manufacture, a structural beam composed of a light, soft, pithy wood having, in a suitable position to permit the securing of said beam to other structural members, a bore provided with a coarse screw-thread of large pitch, a screw-threaded dowel of a tougher wood of similar pitch screwed in said bore and suitable means for fixing said dowel against rotation after insertion.

3. As an article of manufacture, a structural beam composed of a light, soft, pithy wood having, in a suitable position to permit the securing of said beam to other structural members, a bore having a coarse screw-threaded pitch, a screw-threaded dowel of a tougher wood screwed in said bore, and a joint between said bore and dowel formed with a cementitious material to secure the said screw-threaded dowel against rotation after insertion.

4. A beam structure embodying two structural members, one of which is principally composed of balsa wood and provided with a screw-threaded dowel of harder and tougher wood seated within the balsa wood of said member, a joint between said balsa wood and dowel formed with a cementitious material, and a metallic fastening device connecting said balsa wood member with the other member and having a portion inserted within said hard-wood dowel for that purpose.

5. A beam structure embodying an upright member principally composed of balsa wood, a screw-threaded dowel composed of a harder and tougher wood inserted in the end of said upright member, a joint between said dowel and balsa wood member formed with a cementitious material for fixing the dowel against rotation, a transverse beam member composed of a harder and tougher wood seated on the end of said balsa wood upright, and a metallic screw inserted transversely through said transverse member and into said dowel in a longitudinal direction.

6. A beam structure embodying an upright member composed of an intermediate core of balsa wood and relatively thin surface layers of a harder and tougher material securely fastened on opposite sides thereof, a screw-threaded dowel composed of a harder and tougher wood inserted at the end of said beam in said balsa wood core, a joint between said dowel and balsa wood member formed with a cementitious material for fixing the dowel against rotation, a transverse beam member composed of a harder and tougher wood seated on the end of said balsa wood upright, and a metallic screw inserted transversely through said transverse member and into said dowel in a longitudinal direction.

7. A structure embodying, in combination a plurality of main beam members each composed of a core of balsa wood and relatively thin surface layers of a harder and tougher material securely fastened on opposite sides to said core, screw-threaded dowels of a harder wood inserted in and securely fastened against rotation in said core, connecting beam members composed of a harder and tougher wood abutting against said dowel, metallic fastening devices inserted transversely through said connecting members and into said dowels in a longitudinal direction to fasten the said beam members together to form a frame; and an outer sheathing similarly composed of a balsa wood core and relatively thin hard surface layers, fastened to the frame so formed.

In witness whereof, I have signed my name to the foregoing specification in the presence of two subscribing witnesses.

GEORGE H. JONES.

Witnesses:
CHARLES J. GALE,
JOSEPH F. O'BRIEN.